United States Patent [19]
Gineste et al.

[11] Patent Number: 5,578,400
[45] Date of Patent: Nov. 26, 1996

[54] GRAFTED MICROPOROUS SEPARATOR FOR ELECTROCHEMICAL GENERATOR AND A PROCESS FOR ITS PRODUCTION

[75] Inventors: Jean-Luc Gineste; Gérald Pourcelly, both of Montpellier; John Brunea, Avon; Francoise Perton, Beruges; Michel Broussely, Liguge, all of France

[73] Assignee: Saft, Romain Ville, France

[21] Appl. No.: 600,281

[22] Filed: Feb. 12, 1996

Related U.S. Application Data

[63] Continuation of Ser. No. 103,702, Aug. 10, 1993, abandoned.

[30] Foreign Application Priority Data

Aug. 11, 1992 [FR] France ................... 92 09900

[51] Int. Cl.[6] ................................................. H01M 2/16
[52] U.S. Cl. ........................ 429/249; 429/194; 429/253
[58] Field of Search ........................... 429/247, 249, 429/250, 194, 253, 254

[56] References Cited

U.S. PATENT DOCUMENTS

| | | | |
|---|---|---|---|
| 3,982,960 | 9/1976 | Hoekje et al. | 429/199 |
| 4,539,277 | 9/1985 | Ishigaki et al. | 429/249 |
| 4,629,540 | 12/1986 | Genieès et al. | 204/59 R |
| 4,705,636 | 11/1987 | Small et al. | 210/638 |
| 5,270,137 | 12/1993 | Kubota | 429/249 |

FOREIGN PATENT DOCUMENTS 0014459  8/1980  European Pat. Off. .

OTHER PUBLICATIONS

JP 62258711 dated Nov. 11, 1987 (Asahi Chemical Ind.).
French Search Report FR 9209900.

*Primary Examiner*—Maria Nuzzolillo
*Attorney, Agent, or Firm*—Sughrue, Mion, Zinn, Macpeak & Seas

[57] ABSTRACT

A separator for an electrochemical generator is constituted by a microporous polyolefin film grafted with at least one monomer selected from diethyleneglycol dimethacrylate, furfuryl acrylate and a diethyleneglycol dimethacrylate/acrylic acid mixture. In a process for the production of a separator of this kind grafting of the monomer is carried out in three stages:

irradiation of the film, if required, storage of the irradiated film, immersion of the irradiated film in the grafting solution comprising the monomer, a solvent, and at least one additive. The separator may be used in an electrochemical generator with either an aqueous or nonaqueous electrolyte where the salt concentration is between 1M and 2M.

5 Claims, No Drawings

GRAFTED MICROPOROUS SEPARATOR FOR ELECTROCHEMICAL GENERATOR AND A PROCESS FOR ITS PRODUCTION

This is a Continuation of Application Ser. No. 08/103,702, filed Aug. 19, 1993, now abandoned.

BACKGROUND OF THE INVENTION

1. Field of the Invention

The present invention concerns an electrochemical generator comprising a grafted microporous separator.

2. Description of the Prior Art

The positive and negative electrodes in an electrochemical generator are separated by an insulating material which allows ionic conduction whilst avoiding any electrical contact between the two electrodes. These properties must be maintained throughout the useful life of the generator. In order to maintain electrical insulation between the two electrodes, the separator must be mechanically and chemically stable under the conditions of use. In addition, high ionic conductivity requires that the separator is uniformly wetted by the electrolyte. Finally, using such a separator on an industrial production line requires mechanical strength so that it can be manipulated easily and stand up to successive operations.

For lithium anode rechargeable generators, the separator is constituted by a microporous polymeric film, specifically a polyethylene or polypropylene film. These films are sufficiently stable with the electrolytes in normal use, but are difficult to wet.

One solution consists in introducing an additive into the electrolyte. A further possibility lies in adding a wetting agent to the surface. These substances are not perfectly inert and their degradation reduces the life of the generator.

Researchers have therefore turned their attention to grafted separators. The monomers which are grafted are olefinic compounds, mainly acrylic and methacrylic acids, vinylpyridine, vinylpyrrolidone, τ-butyrolactone (EP-A-0 262 846), and other substituted vinyl derivatives (U.S. Pat. No. 4,376,168 and U.S. Pat. No. 4,414,090).

Grafting may be effected in the presence of a peroxide or azo catalyst (U.S. Pat. No. 4,287,275) or a metallic catalyst: colloidal silver, platinum, gold, nickel or copper (U.S. Pat. No. 3,376,168).

More efficiently, ionizing radiation may be used, such as gamma rays from a cobalt-60 source (U.S. Pat. No. 4,414,090), an electron beam (U.S. Pat. No. 4,283,442), ultraviolet radiation, plasma emission, or ozonization (U.S. Pat. No. 4,206,275). Irradiation and grafting may be carried out simultaneously or in two stages (U.S. Pat. No. 4,283,442).

The improvement in properties in grafted separators is, however, only observable for electrolytes with a low salt concentration (0.8M $LiAsF_6$: EP-A-0 262 846).

The object of the present invention is to provide a grafted copolymer separator which is wettable in electrolytes having a high salt content.

A further object of the present invention is to produce a grafted separator having improved properties as well as mechanical strength and production conditions which enable it to be used in the industrial manufacture of electrochemical generators.

SUMMARY OF THE INVENTION

The present invention provides a separator for an electrochemical generator constituted by a microporous polyolefin film grafted with at least one monomer selected from diethyleneglycol dimethacrylate (DEGDM), furfuryl acrylate (FA), and a diethyleneglycol dimethacrylate/acrylic acid (DEGDM/AA) mixture.

In one embodiment, the film is grafted with a diethyleneglycol dimethacrylate/acrylic acid (DEGDM/AA) mixture, the molar proportion of each of the monomers being between 40% and 60%.

DEGDM is a reticulating agent which produces films which are, for example, wettable in non-aqueous, propylene carbonate (PC) and ethylene carbonate (EC) based electrolytes, where the concentration of salt is equal to or greater than 1.5M. AA alone results in imperfect wetting which limits the lifetime, whereas the association of DEGDM and AA results in a longer lifetime particularly for lithium anode rechargeable generators.

Said film is selected from polyethylene and polypropylene microporous films.

According to one embodiment, the global graft percentage of diethyleneglycol dimethacrylate, defined as follows:

$$\text{global graft percent} = \frac{\text{increase in mass on grafting}}{\text{film mass before grafting}} \times 100\%$$

is between 15% and 50%.

Said global graft percentage for the diethyleneglycol dimethacrylate/acrylic acid mixture is between 5% and 50%.

For global graft percentage values greater than 50%, the mechanical strength of the separator is no longer sufficient for it to be utilizable in generators.

According to one embodiment of the invention, grafting of the monomer is carried out in three stages:
irradiation of said film,
if required, storage of said irradiated film, wherein its activity is retained over several months,
immersion of said irradiated film in a grafting solution comprising said monomer and a solvent selected from water, methanol, butanol and mixtures thereof.

Said grafting solution further comprises at least one additive selected from sulfates of iron, copper, ferrous-ammonium (Mohr's salt), chlorates of iron and copper, and methylene blue. These additives limit homopolymerization side reactions of the monomers in solution (Mohr's salt) and moderate the graft percentage (methylene blue), for example.

Said grafting solution is at a temperature of between 40° and 80° C. The film is immersed in said solution for between 1 and 30 hours depending on the proportions of the different monomers in the solution and the desired graft percentage.

Said irradiation is effected by bombarding said film with an electron beam in the presence of oxygen to form peroxide and hydroperoxide sites. The separator is irradiated whilst dry by an electron emitting ionizing source, creating free radicals which, on reaction with the oxygen in the air, produce hydroperoxide groups. The irradiation dose is between 0.5 Mrads and 4 Mrads, preferably 1 Mrad. Too high an irradiation dose weakens the film and renders it brittle.

A film irradiated in this fashion has high reactivity to further grafting. In addition, the sites created by irradiation are stable and thus the film can be stored for several months at low temperatures.

Grafting of said monomer onto said film occurs at the peroxide and hydroperoxide sites produced during irradiation, by simple contact of the irradiated separator with the monomer in solution. The grafting step is carried out in a thermostatic bath. A rise in temperature inhibits the grafting reaction by causing decomposition of the peroxide and hydroperoxide sites.

The following depicts a simplified reaction chain, excluding secondary reactions:

irradiation:

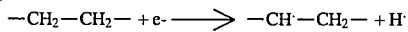

oxidation:

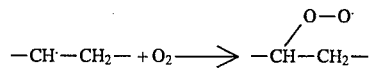

then:

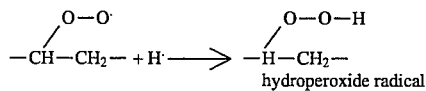

and:

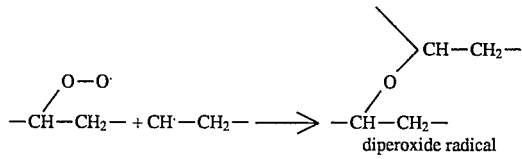

From an industrial viewpoint, the present invention has the advantage of requiring the irradiation source only for a few minutes during the irradiation operation rather than during the entire grafting process; of producing a higher quality product because of the low amount of homopolymer, thus facilitating purification; and particularly of allowing long term storage between the irradiation and grafting steps.

The present invention concerns the use of a separator in a non-aqueous electrolyte electrochemical generator, where the anode is selected from lithium, a lithium alloy and a lithium insertion compound such as lithium inserted into carbon, and where the cathode is selected from transition metal oxides and sulfides, preferably vanadium oxide, and lithium containing oxides of manganese, nickel and cobalt.

Said generator contains a non-aqueous electrolyte wherein the solvent comprises at least one ester selected from propylene, ethylene, dimethyl and diethyl carbonates and wherein the solute is selected from lithium salts and mixtures thereof. Preferably, the solvent further comprises at least one ether selected from the glyme family. The concentration of said solute is between 1M and 2M.

Said electrolyte is preferably composed of a mixture of propylene carbonate and ethylene carbonate with dimethoxyethane as the solvent and $LiAsF_6$ as the salt.

The present invention further concerns the use of a separator in an electrochemical generator wherein the electrolyte is an aqueous alkaline solution.

DETAILED DESCRIPTION OF THE INVENTION

Further features and advantages of the present invention will become apparent from the following illustrative but non-limiting examples.

EXAMPLE 1

Prior Art

Grafting AA onto polypropylene film

A film of commercially available microporous polypropylene film (Celgard 2502 from Celanese Corp) with a thickness of 50 μm was selected as the support for the graft. It was irradiated in the presence of oxygen using an electron accelerator. The irradiation dose was 2 Mrad. The irradiated film was then stored for six months at a temperature of −18° C.

The grafting solution was composed as follows:

| | |
|---|---|
| AA | 25% by volume |
| Water | 75% by volume |
| Sulfuric acid | $6.6 \times 10^{-2}$ mole/l |
| Iron sulfate | 1.25 g/l |

The irradiated film was immersed in the grafting solution. The solution was degassed by bubbling through nitrogen for 15 minutes to eliminate oxygen which inhibits the grafting reactions. It was maintained at 65° C. in a thermostatted bath for 24 hours. The film was then washed with water, then with methanol, then oven dried at 60° C. A graft percentage of 32% was obtained.

Whatever the graft percentage, separators grafted with AA are not wettable by a PC/EC electrolyte where the lithium salt concentration is greater than 1.2M. For a graft percentage of 32% and a salt concentration of 1M, wetting was very slow and the electrical resistance was 23 ohms.cm².

EXAMPLE 2

Grafting of DEGDM onto a Polypropylene Film

Example 1 was repeated except that the irradiation dose was 1 Mrad.

The grafting solution was composed as follows:

| | |
|---|---|
| DEGDM | 19% by volume |
| Methanol | 62% by volume |
| Water | 19% by volume |
| Iron-ammonium sulfate | 0.2 g/l |
| Methylene blue | 0.88 g/l |

The irradiated film was immersed in the grafting solution, maintained at 65° C. for 19 hours then washed and dried as described in example 1. A graft percentage of 32% was obtained.

Table I shows the results of wetting tests for $LiAsF_6$ concentrations of 1M to 2M, as well as the electrical resistance (R) for four separator examples (PD1 to PD4) of polypropylene film grafted with DEGDM where the graft percentage (T) varies from 16% to 37%.

Rapid wetting was observed in electrolytes where the solvent was constituted by a mixture of equal parts (1/1) of PC and EC, containing a lithium salt such as $LiAsF_6$, for concentrations of between 1M and 2M. Ungrafted polypropylene film (P) is not at all wettable by these electrolytes.

Electrical resistance was measured in the same electrolyte at a concentration of 1M of $LiAsF_6$, using a conductimeter in a PTFE cell. This was composed of two communicating compartments with the grafted separator placed between them. Each compartment comprised a platinum in mercury electrode. The cell was sealed using O-rings. The separator surface was 0.78 cm².

EXAMPLE 3

Grafting of DEGDM/AA mixture

Example 1 was repeated except that the irradiation dose was 1 Mrad and the grafting solution was constituted as follows:

| | |
|---|---|
| AA | 10% by volume |
| DEGDM | 4.5% by volume |
| Methanol | 50% by volume |
| Water | 27.5% by volume |
| Iron sulfate | 7.5 g/l |

The irradiated film was immersed in the grafting solution which was then degassed and maintained at 65° C. for 20 hours. A graft percentage of 13% was obtained.

Characterization of the film obtained was carried out as for example 2. The film was rapidly wetted for concentrations of salt $LiAsF_6$ up to 1.7M, and slightly more slowly up to 2M. The electrical resistance reached 9.7 ohm.cm².

Table II shows the results of wetting tests (M) for $LiAsF_6$ salt concentrations of 1M to 2M for six separator samples (S), along with measures of electrical resistance (R) of polypropylene films grafted with the DEGDM/AA mixture (PDA1 to PDA6) at grafting percentages (T) varying between 7.5% and 48%.

The separator was not wettable by a PC/EC electrolyte at lithium salt concentrations greater than or equal to 1M for graft percentages of less than 5%; for graft percentages greater than 50%, the film was very brittle and could not be manipulated.

EXAMPLE 4

Lithium/Lithium Cycling

Microporous polypropylene strips 1.7 m long and 41 mm wide were grafted with a DEGDM/AA mixture as described in example 3.

Graft percentages varying between 7.6% and 48% were obtained by varying the composition of the grafting solution and the operating conditions, for example the irradiation dose, solvent, homopolymerization inhibitor concentration, etc.

The grafted separator was placed in a test cell comprising two electrodes: one of lithium, the other of nickel upon which a known quantity of lithium has been deposited. Cycling was carried out for varying concentrations of salt $LiAsF_6$ (1M to 2M) in several electrolytes (Y), wherein the solvent was PC/EC-based with, if necessary, the addition of two parts (1/1/2) or three parts (1/1/3) dimethoxyethane (DME).

The number of cycles obtained allowed the lithium yield ($R_{Li}$) to be calculated from the formula:

$$\left(1 - \frac{Q_i - Q_c}{NQ_c}\right) \times 100$$

where $Q_i$ is the quantity of lithium deposited initially on the nickel electrode, $Q_c$ is the quantity of lithium used in each cycle and N is the total number of cycles carried out. The values obtained for seven strips (1 to 7) of separator (S) are shown in Table III.

EXAMPLE 5

Test with Rechargeable Cylindrical Generators

Separator strips 2 and 4 from example 4 were selected for cycling tests in rechargeable cylindrical spiral generators (nos 1 to 8) 50 mm high and 25.5 mm in diameter. Three series of generators were assembled, combining two electrolytes (Y) similar to those described in example 4 with the two reference separator strips (S).

Generator performance was determined by cycling at room temperature until breakdown, under the following conditions:

discharge: $I_d$=200 mA up to 2.8 volts,
charge: $I_c$=100 mA up to 3.8 volts;
the 11th discharge was carried out a current of 1 A up to 2.5 volts.

Table IV summarises the characteristics and results obtained for these generators: average discharge voltage ($U_d$) and discharged capacity ($C_d$) for the 9th and 11th discharge.

Table V summarises the cycling results obtained with the rechargeable generators: number of cycles carried out (N), total discharged capacity ($C_{Td}$) in Ah, yield with respect to lithium ($R_{Li}$), F.O.M. (figure of merit).

The F.O.M. is defined as the ratio:

$$\frac{C_{Td}}{C_i}$$

where $C_i$ is the initial capacity equivalent to the mass of lithium initially introduced into the generator.

The present invention is not, of course, limited to the examples given. In particular, the separator may be used in any type of generator, whether rechargeable or not.

TABLE I

| S | T % | LiAsF$_6$ M |  |  |  |  |  |  |  | R ohm·cm$^2$ |
|---|---|---|---|---|---|---|---|---|---|---|
|   |   | 2 | 1.82 | 1.67 | 1.54 | 1.33 | 1.18 | 1.11 | 1 |   |
| P | 0 | o | o | o | o | o | o | o | o | — |
| PD1 | 16 | o | o | o | o | o | + | ++ | ++ | 8.1 |
| PD2 | 22 | +++ | +++ | +++ | +++ | +++ | +++ | +++ | +++ | 9.4 |
| PD3 | 32 | +++ | +++ | +++ | +++ | +++ | +++ | +++ | +++ | 9.1 |
| PD4 | 37 | +++ | +++ | +++ | +++ | +++ | +++ | +++ | +++ | 9.2 |

+++ → rapid wetting
++ → slow wetting
+ → very slow wetting
o → no wetting

TABLE II

| S | T % | LiAsF$_6$ M |  |  |  |  |  |  |  | R ohm·cm$^2$ |
|---|---|---|---|---|---|---|---|---|---|---|
|   |   | 2 | 1.82 | 1.67 | 1.54 | 1.33 | 1.18 | 1.11 | 1 |   |
| P | o | o | o | o | o | o | o | o | o | — |
| PDA1 | 7.5 | + | ++ | ++ | +++ | +++ | +++ | +++ | +++ | 11.7 |
| PDA2 | 12 | ++ | ++ | +++ | +++ | +++ | +++ | +++ | +++ | 10.4 |
| PDA3 | 13 | ++ | ++ | +++ | +++ | +++ | +++ | +++ | +++ | 9.7 |
| PDA4 | 29 | +++ | +++ | +++ | +++ | +++ | +++ | +++ | +++ | 14.8 |
| PDA5 | 38 | +++ | +++ | +++ | +++ | +++ | +++ | +++ | +++ | 15.1 |
| PDA6 | 48 | +++ | +++ | +++ | +++ | +++ | +++ | +++ | +++ | 13.8 |

+++ → rapid wetting
++ → slow wetting
+ → very slow wetting
o → no wetting

TABLE III

| S | T % | LiAsF$_6$ M | R$_{Li}$ % PC/EC 1/1 | PC/EC/DME 1/1/2 | PC/EC/DME 1/1/3 |
|---|---|---|---|---|---|
| 1 | 7.6 | 1 | 89 | 85 | — |
|   |   | 1.50 | 90 | 86 | — |
|   |   | 1.75 | 95 | — | — |
| 2 | 9 | 1 | 89 | 87 | — |
|   |   | 1.50 | 92 | 86 | 87 |
|   |   | 1.75 | 91 | — | — |
| 3 | 13.2 | 1 | 85 | 85 | — |
|   |   | 1.50 | 83 | 87 | — |
|   |   | 2 | 93 | — | — |
| 4 | 14.6 | 1 | 90 | 87 | — |
|   |   | 1.50 | 92 | 86 | 90 |
|   |   | 1.75 | 92 | — | — |
|   |   | 2 | 94 | — | — |
| 5 | 29 | 1 | 91 | — | — |
| 6 | 38 | 1 | 88 | — | — |
| 7 | 48 | 1 | 90 | — | — |

TABLE IV

| S | Y | No | U$_d$ V 9 | U$_d$ V 11 | C$_d$ Ah 9 | C$_d$ Ah 11 |
|---|---|---|---|---|---|---|
| 2 | PC/EC 1/1 LiAsF$_6$ 1.5M | 1 | 2.84 | 3.18 | 1.02 | 1.10 |
|   |   | 2 | 2.84 | 3.19 | 1.05 | 1.13 |
| 4 | PC/EC 1/1 LiAsF$_6$ 1.5M | 3 | 2.77 | 3.17 | 0.85 | 1.20 |
|   |   | 4 | 2.77 | 3.19 | 1 | 1.23 |
|   |   | 5 | 2.80 | 3.19 | 1.07 | 1.19 |
| 4 | PC/EC/DME 1/1/3 LiAsF$_6$ 1.5M | 6 | 2.99 | 3.22 | 1.12 | 1.17 |
|   |   | 7 | — | 3.16 | — | 1.22 |
|   |   | 8 | 2.94 | 3.21 | 1.18 | 1.22 |

TABLE V

| S | Y | No | N | C$_{Td}$ Ah | R$_{Li}$ % | F.O.M. |
|---|---|---|---|---|---|---|
| 2 | PC/EC 1/1 LiAsF$_6$ 1.5M | 1 | 46 | 51.48 | 86.7 | 7.5 |
|   |   | 2 | 36 | 40.68 | 82.8 | 5.8 |
| 4 | PC/EC 1/1 LiAsF$_6$ 1.5M | 3 | 40 | 48.40 | 85.2 | 6.7 |
|   |   | 4 | 47 | 58.06 | 87.8 | 8.2 |
|   |   | 5 | 38 | 45.73 | 84.9 | 6.6 |
| 4 | EPC/EC/DME 1/1/3 LiAsF$_6$ 1.5M | 6 | 53 | 61.97 | 88.5 | 8.7 |
|   |   | 7 | 55 | 66.21 | 89.2 | 9.2 |
|   |   | 8 | 64 | 79.47 | 90.9 | 11.1 |

There is claimed:

1. An electrochemical generator containing a non-aqueous electrolyte, and a separator, said separator comprising a microporous polyolefin film grafted with at least one monomer, selected from the group consisting of diethyleneglycol dimethacrylate, furfuryl acrylate and a diethyleneglycol dimethacrylate/acrylic acid mixture.

2. The electrochemical generator according to claim 1 wherein said film is grafted using a diethyleneglycol dimethacrylate/acrylic acid mixture, the molar proportion of each of the monomers being between 40% and 60%.

3. The electrochemical generator according to claim 1 wherein the polyolefin film has a global grafting percentage of diethyleneglycol dimethacrylate, as defined by the relation:

$$\text{global graft percent} = \frac{\text{increase in mass by grafting}}{\text{film mass before grafting}} \times 100\%$$

is between 15% and 50%.

4. The electrochemical generator according to claim 1 wherein said polyolefin film has a global grafting percentage of the diethyleneglycol dimethacrylate/acrylic acid mixture is between 5% and 50%.

5. The electrochemical generator according to claim 1 wherein said film is selected from the group consisting of microporous polyethylene and polypropylene films.

* * * * *